United States Patent [19]
Haneda et al.

[11] Patent Number: 5,608,497
[45] Date of Patent: Mar. 4, 1997

[54] ELECTROPHOTOGRAPHIC COLOR IMAGE FORMING APPARATUS

[75] Inventors: Satoshi Haneda; Masakazu Fukuchi; Tadayoshi Ikeda, all of Hachioji, Japan

[73] Assignee: Konica Corporation, Tokyo, Japan

[21] Appl. No.: 451,277

[22] Filed: May 30, 1995

[30] Foreign Application Priority Data

Jun. 1, 1994 [JP] Japan .................................... 6-120314
Jun. 3, 1994 [JP] Japan .................................... 6-122641

[51] Int. Cl.⁶ .................................... G03G 15/01
[52] U.S. Cl. ........................ 399/153; 347/232; 399/223; 399/285
[58] Field of Search ............... 355/326 R, 327, 355/210, 211, 200; 347/115, 232

[56] References Cited

U.S. PATENT DOCUMENTS 5,537,199  7/1996  Takai et al. ................ 355/326 R
5,541,722  7/1996  Ikeda et al. ................ 355/326 R

*Primary Examiner*—Nestor R. Ramirez
*Attorney, Agent, or Firm*—Frishauf, Holtz, Goodman, Langer & Chick, P.C.

[57] ABSTRACT

In an apparatus in which a yellow, magenta, and cyan toner images are superimposed on a photoreceptor drum made of a transparent material, an image exposure device is provided in the photoreceptor drum and emits exposure lights whose wavelength has a spectral reflective ratio lower than 30% for at least two of yellow, magenta, and cyan toners. The image forming processes is controlled so that a toner image for which the exposure lights have a spectral reflective ratio larger than 30% is formed after toner images for which the exposure lights have a spectral reflective ratio lower than 30% have been formed.

7 Claims, 14 Drawing Sheets

SPECTRAL REFLECTION
RATIO OF COLOR TONER ized as to become a floating# ELECTROPHOTOGRAPHIC COLOR IMAGE FORMING APPARATUS

BACKGROUND OF THE INVENTION

The present invention relates to an electrophotographic color image forming apparatus in which a plurality of image exposure means (an optical exposure system) are provided in an image forming member (a photographic drum), a plurality of developing means are arranged along the circumferential surface of the image forming member, and toner images are superimposed on the surface so that a color image is formed while the image forming member is rotated one rotation.

As a method of forming a multi-color image, there have been known several techniques using the following apparatus:

An apparatus (A) in which photoreceptor drums, charging devices and developing devices each corresponding in number to colors necessary for forming the multi-color image are provided, and a mono-color toner image formed on each photoreceptor drum is superimposed one after another on a transfer drum so as to form a color image.

An apparatus (B) in which a single photoreceptor drum is rotated plural times so that the charging, image exposure and developing processes are repeated for each color so as to form a color image.

An apparatus (C) in which the charging, image exposure and developing processes are conducted for each color sequentially so as to form a color image while a single photoreceptor drum is rotated one rotation.

However, the apparatus (A) has a drawback that the dimensions of the apparatus become too large because the plurality of photoreceptor drums and the transfer drum are required. The dimensions of the apparatus (B) can be made relatively smaller because the required number of each of the charging means, image exposure means and photoreceptor is only a single, however, the apparatus (B) has a limitation that the size of a formed image is limited not to be larger than the area of the circumferential surface of the photoreceptor drum.

The apparatus (C) makes it possible to form images at a high speed.

However, the apparatus (C) has a restriction in a structural arrangement that the plurality of charging devices, image exposure means and developing devices must be arranged within a circumferential area of the photoreceptor drum. Further, the apparatus (C) has a problem that an image exposure means to conduct an image exposure is apt to be soiled with toners leaking from a developing device neighboring the image exposure means and may resultingly degrade an image quality. In order to avoid this problem, it is required that the distance between the image exposure means and the developing device is to be made larger. With this requirement, the apparatus (C) has a contradiction that the diameter of the photoreceptor drum inevitably become large, resulting in that the apparatus also inevitably become large.

For the purpose of eliminating the above contradiction in the apparatus (C), an apparatus, in which the base member of a photoreceptor drum is made of a transparent material and a plurality of image exposure means are incorporated in the photoreceptor drum so that an image is exposed from the image exposure means through the base member onto a photosensitive layer on the external surface of the base member, has been suggested (for example, Japanese Patent Publication Open to Public Inspection No. 307307/1993).

However, the apparatus according to the above suggestion has drawbacks that, as shown in FIG. 6, in the event that an image exposure means 12 provided on a supporting member 20 is arranged inside an image forming member (a photoreceptor drum) 10 and the image forming member 10 is exposed from its inside, exposure lights are reflected from a toner layer T, come again into a photosensitive layer 10c of the image forming member 10, and are scattered in the photosensitive layer 10c so that a latent image is agitated with the scattered lights and a clear image having a good color balance can not be formed.

The first object of the present invention is to eliminate above drawbacks and to provide a color image forming apparatus capable of obtaining a clear image having a good color balance.

Further, in an apparatus in which an image exposure means is provided in an image forming member, since a photosensitive layer is exposed again with reflected lights which have been emitted to an inside of the apparatus after passing through the photosensitive layer and have been reflected on the inside of the apparatus, a latent image formed on the photosensitive layer is inevitably affected by the re-exposure to some extent.

Still further, in the event that an image forming member on which a toner image has been already formed is further image exposed, some toners on a part of the toner image at a position on which the image forming member is electrically discharged by the exposure may become a floating condition so that there is a risk that the toners may be scattered.

Still further, an additional exposure process is conducted for an image forming member in order to eliminate remaining charge with an exposure light before a charging process to charge a photosensitive layer, during a transferring process to transfer a toner image, or before a cleaning process to remove residual toner remaining after the transferring process, whereby a uniform electric potential can be applied, a transfer rate can be increased or the residual toner can be removed easily. However, if useless reflected lights are generated by the additional exposure processes, the reflected light further cause a latent image having been formed on the image forming member to degrade or toners to scatter in the apparatus, similar to the problem in the image exposure process mentioned before.

The second object is to effectively prevent exposure lights from repeatedly exposing a photosensitive layer and from causing toner to scatter on each exposure process conducted during image exposure, before charging, simultaneously with the transfer process, or before the cleaning process by solving the above problems and by making an improvement, and, as a result, to provide a color image forming apparatus capable of forming a high grade image.

SUMMARY OF THE INVENTION

In a color image forming apparatus in which a charging process by a charging means, an image exposure process by the image exposing means, and a development process by a developing means are repeated for an image forming member so as to superimpose toner images of yellow, magenta, cyan, and black toners one after another on the image forming member so that a color image is formed on the image forming member, thereafter the color image is transferred onto a transfer sheet at a time, the first object is attained by the color image forming apparatus characterized in that the image exposure means is provided in the image forming member, and emits exposure lights which have a sensitivity to the image forming member and comprises a wavelength having a reflection ratio of 30% or less to the toner image formed on the image forming member.

In a color image forming apparatus in which a charging process, an image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the fourth example) characterized in that the image forming member incorporates a plurality of image exposure means in its inside and a light absorbing member is provided at an outside of an exposing process section of the image forming member opposite to a position of each image exposure means.

In a color image forming apparatus in which a charging process, a image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the fifth example) characterized in that the image forming member incorporates a plurality of image exposure means in its inside and an electrode applied with a electric voltage having the same polarity as toners is provided at an outside of an exposing process section of the image forming member opposite to a position of each image exposure means.

In a color image forming apparatus in which a charging process, a image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the sixth example) characterized in that the image forming member incorporates a plurality of image exposure means in its inside and an exposing process section by each image exposure means is arranged at a position in a development housing and upstream of a developing sleeve of a developing means.

In a color image forming apparatus in which a charging process, a image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the seventh example) characterized in that the image forming member incorporates a plurality of image exposure means in its inside and an exposing process section by a pre-charging exposure means is arranged at a position in a cleaning housing which locates upstream of a charging member and downstream of a cleaning member.

In a color image forming apparatus in which a charging process, a image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the eighth example) characterized in that the image forming member incorporates a plurality of image exposure means in its inside and an exposing process section by a pre-cleaning exposure means is arranged at a position in a cleaning housing upstream of a cleaning member.

In a color image forming apparatus in which a charging process, a image exposure process, and a development process are repeatedly conducted for an image forming member so as to superimpose toner images one after another on the image forming member so that a color image is formed on the image forming member, thereafter the color image is transferred onto a transfer sheet at a time, the second object is attained by the color image forming apparatus (described as the ninth example) characterized in that the image forming member incorporates a plurality of image exposure means in its inside and an exposing process section by a simultaneous-transferring exposure means is arranged at a position downstream of the closest position on which the image forming member locates closest to a transferring member.

DETAILED DESCRIPTION OF THE PREFERRED EMBODIMENT

In the event that a plurality of image exposure means are used in the present invention, each image exposure means uses the same exposure light of the same wavelength. It may be difficult to use together plural image exposure means differing in wavelength with which the plural image exposure means effect different image forming-control capabilities for an image forming member having various spectral sensitivities. The application of the same type image exposure means having the same wavelength may make it possible to form an image stably.

Figure 5:
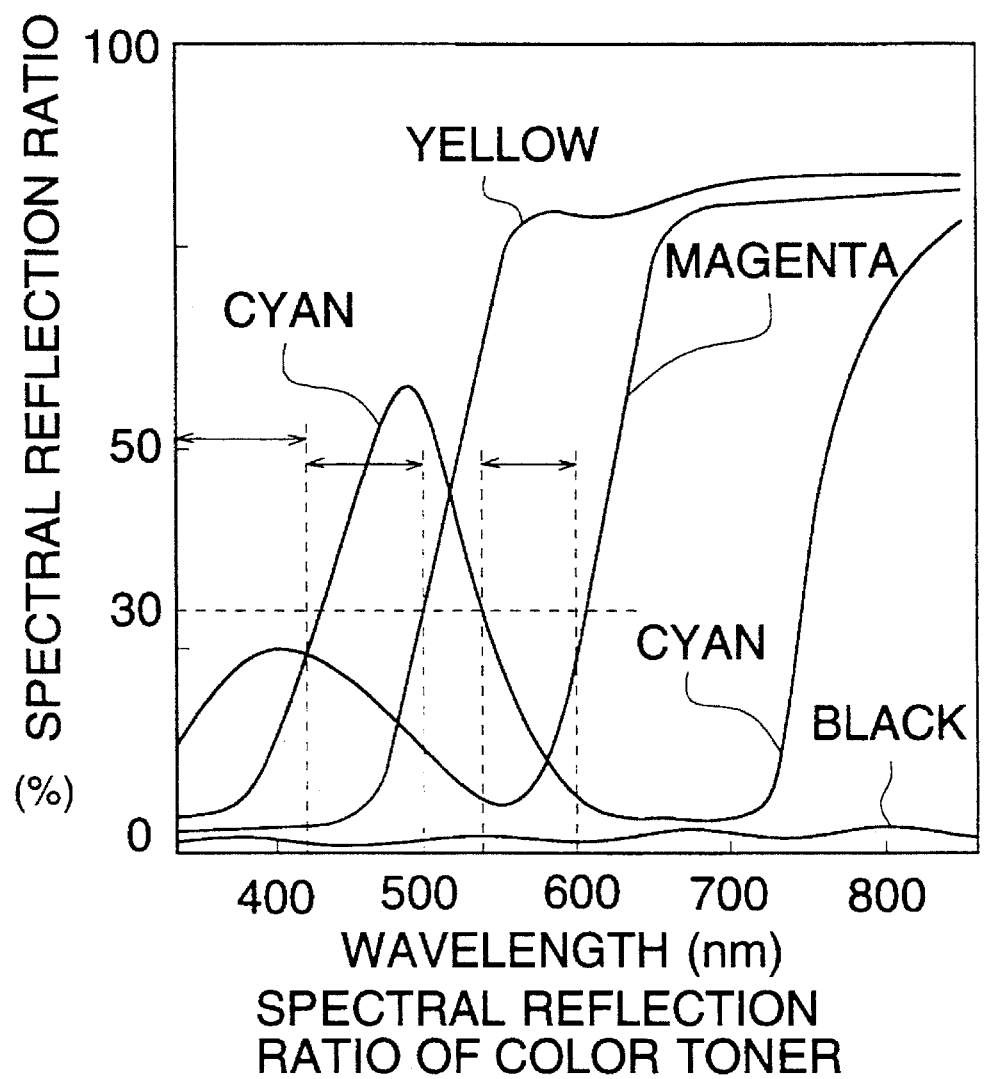
FIG. 5 is a graph showing a spectral reflectance of a color toner.
Figure 6:
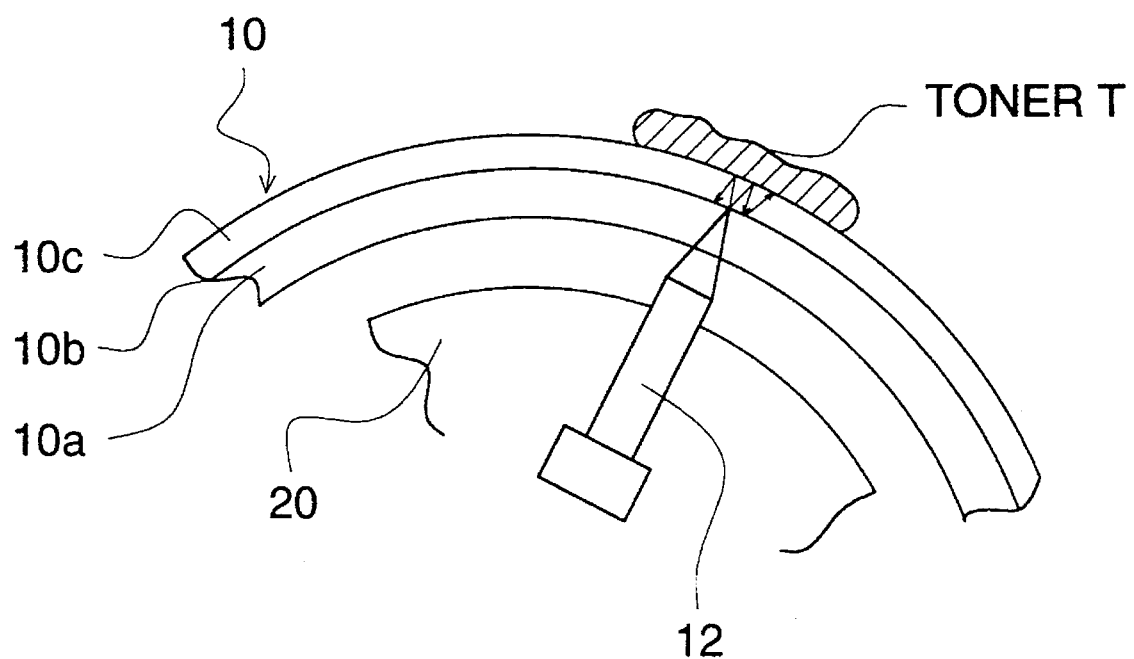
FIG. 6 is an illustration showing light-scattering in a time of exposing in a prior art apparatus.

Prior to explanation of the examples of the present invention, firstly, the spectral reflection ratio of color toner will be explained. Usually, the spectral reflection ratio of the color toner indicates the characteristic as shown in FIG. 5. The spectral reflection ratio was obtained by the measurement of the reflection ratio of each toner coated on a white board. The low reflection ratio means that an absorbing ratio of a measurement light in the toner layer is large. On the other hand, the high reflection ratio means that a transmission rate is large.

As a result of an experiment, when the spectral reflection ratio exceeds over 30%, it has been found that the scattering from the toner on the image forming member occurs greatly as mentioned above and a sharp image may not be obtained. From this result, it has been found that a wavelength used for an image exposure is greatly affected by a toner layer formed on the image forming member and that an arrangement to make the spectral reflection ratio lower than 30% may solve the above problems.

It can be known from the characteristic shown in FIG. 5, an exposure light having a wavelength of 550 to 600 nm has a reflection ratio lower than 30% for a magenta toner and a cyan toner, an exposure light having a wavelength of 420 to 500 nm has a reflection ratio lower than 30% for a yellow toner and a magenta toner, an exposure light having a wavelength lower than 420 nm has a reflection ratio lower than 30% for all toners. Incidentally, a black toner indicates a reflection ratio, about 0%, lower than a color toner for every wavelength.

In the present invention, an optical exposure system 12 has a sensitivity for a photosensitive layer of photoreceptor drum 10 used as the image forming member, and is selected so as to emit a light consisting of a wavelength having a lower reflection ratio for a toner image formed on the photoreceptor drum 10. Accordingly, in a color image forming apparatus of the present invention, a wavelength of emission light of 550 to 600 nm, 420 to 550 nm or not higher than 420 nm is used for LED of the optical exposure system 12. In the case that the wavelength is 550 to 600 nm, an image formation for yellow (Y) is conducted lastly. In the case that the wavelength is 420 to 550 nm, an image formation for cyan (C) is conducted lastly. On the other hand, in the case that the wavelength is not higher than 420 nm, any image formation order is permissible. With the above constructions and the image formation processes, it can be possible to make the reflection by a previously-formed toner image small, thereby obtaining a clear image.

The first object of the present invention can be attained by examples 1, 2 or 3 mentioned below.
Example 1

A constitution of example 1 of the present invention will be explained as follows, referring to FIGS. 1, 2 and 3.

The numeral 10 is a drum-shaped image-forming member, that is, a photoreceptor drum, and it is made in such a manner that an outer circumferential surface of a cylindrical base member 10a made of an optical glass or a transparent member of a plastic such as acrylic resins is coated with a transparent conductive layer 10b and an organic photoconductor layer (OPC) 10c.

A flange 10A at one end of the photoreceptor drum 10 is supported by a guide pin 30P with a bearing in a cartridge 30 which will be explained later. An inner circumferential surface of a flange 10B at the other end of the photoreceptor drum 10 is fit with a plurality of guide roller 40R provided on a base plate 40 of the apparatus body. A gear 10 on an outer circumferential surface of a flange 10B is engaged with a driving gear 40G so that the photoreceptor drum 10 is rotated clockwise by the driving force through the driving gear 40G on a condition that the abovementioned transparent conductive layer is grounded.

The numeral 11 represents a scorotron charging unit as a charging means which charges electrically the organic photoconductor layer of the photoreceptor drum 10 through corona discharging by a grid kept at a predetermined potential level and a corona wire, whereby the photoreceptor drum 10 is provided with an uniform potential.

Numeral 12 represents an optical exposure system, as an image exposure means, composed of light emitting elements such as LED, FL, EL, and PL aligned in the axial direction of the photoreceptor drum 10 and Selfoc lenses. Image signals for each color read by a separate image reading device are taken out successively from a memory and are inputted as electric signals into each of the optical exposure systems 12. A wavelength of a light emitted from the light emitting elements used in this example is ranged within 550 to 600 nm.

Each of the optical exposure systems 12 is attached on a cylindrical pillar-like supporting member 20 which is guided by a guide pin 40P1 and fixed on the base plate 40 of the apparatus body, whereby the optical exposure systems are accommodated inside of the photoreceptor drum 10. Instead of the above light emitting elements, the optical exposure system 12 can be also composed of a combination of optical shutter elements such as LCD, LISA, and PLZT and Selfoc lenses. In this case, since a light source can be selected so as to provide a suitable wavelength, a flexibility in the wavelength selection become large on comparison with the former light emitting elements.

The numerals 13Y to 13K are developing devices, as a developing means, containing respectively a corresponding one of developing agents of yellow (Y), magenta (M), cyan (C) and K (black), and each developing device is equipped with a developing sleeve 130 which locates to keep a predetermined gap distance to a circumferential surface of the photoreceptor drum 10 and rotates in the same direction as that of the photoreceptor drum 10.

Each developing device conducts a reversal development on a non-contact condition under an application of a developing bias voltage for an electrostatic latent image which has been formed on the photoreceptor drum 10 through a charging process by the charging device 11 and an image exposure process by the optical exposure system 12.

Next, a color image forming process in the apparatus of the present invention will be explained.

An image on a document read by an image sensor in an image reading device which is separate from the present apparatus, or an image compiled by a computer is stored in a memory temporarily as image signals of each color of Y, M, C and K.

At the start of an image recording, a photoreceptor driving motor starts rotating so as to rotate clockwise the photoreceptor drum 10 and, simultaneously, the scorotron charging unit 11 (M) starts providing an electric potential to the photoreceptor drum 10 through its charging action.

After the photoreceptor drum 10 has been provided with the electric potential, an image exposure is started by electric signals corresponding to the first color signals, that is, magenta (M) image signals in the optical exposure system 12 (M), and an electrostatic latent image corresponding to a magenta (M) image of the document image is formed on a light-sensitive layer on the surface of the drum with the rotary scanning of the drum.

The latent image is subjected to the reversal development conducted by a developing unit 13 (M) under the non-contact condition of developing agent on a developing sleeve, and a magenta (M) toner image is formed on the photoreceptor drum 10 as the photoreceptor drum 10 rotates.

Then, photoreceptor drum 10 is further provided an electric potential on the magenta (M) toner image formed thereon through a charging operation of the charging unit 11 (C), then an image exposure is conducted by electric signals corresponding to the second color signals, that is, cyan (C) image signals, in the optical exposure system 12 (C), and a cyan (C) toner image is superimposed on the aforementioned magenta (M) toner image through the non-contact type reversal development by the developing unit 13 (C).

In the same process as in the foregoing, a black (K) toner image corresponding to the third color signals is formed and superimposed by the charging unit 11 (K), optical exposure system 12 (K) and developing unit 13 (K), and, lastly, a yellow (Y) toner image corresponding to the fourth color signals is formed and superimposed in succession by the charging unit 11 (Y), the optical exposure system 12 (Y) and the developing unit 13 (Y), whereby a color toner image is formed on the circumferential surface of the photoreceptor drum 10 within its one rotation.

Exposure to an organic photoconductor layer of photoreceptor drum 10 is conducted by the optical exposure systems 12 (Y, M, C, K) mentioned above through the transparent base member from the inside of the drum 10. Therefore, the image exposures corresponding to the second, third and fourth color signals can be conducted respectively without receiving any influence except its own reflection, because each exposure light does not pass through toner images formed in the preceding steps, thus it is possible to form an electrostatic latent image equivalent in quality to that corresponding to the first color signals. Incidentally, with regard to the stabilization of a temperature and the prevention of a temperature rise in the photoreceptor drum 10 against a heat generated by the optical exposure systems 12, a material having an excellent thermal conductivity is used for the supporting member 20. When the temperature is low, a heater is used, while it is high, a heat is released to the outside through a heat pipe. In the case of developing operation conducted by each developing unit 13, developing bias in which DC is added or AC is further added is applied on each developing sleeve 130, then the jumping development with one-component or two-component developing agent contained in the developing unit is conducted, and the non-contact type reversal development is carried out for the photoreceptor drum 10 having a grounded transparent conductive layer 10b.

A color toner image thus formed on the peripheral surface of the photoreceptor drum 10 is transferred in a transfer device 14A onto a transfer sheet as a transfer member which is sent out from a sheet feed cassette 15 and is fed synchronously with the toner image on the photoreceptor drum 10 by the drive of the timing roller 16.

Transfer sheet onto which the toner image has been transferred is electrically discharged by the discharger 14b, so that the transfer sheet P is separated from the peripheral surface of the drum. In a fixing unit 17, the toner image is fused and fixed onto the transfer sheet. After that, the transfer sheet is discharged to a paper discharge tray on a upper portion of the apparatus through a paper discharge rollers 18.

On the other hand, after the transfer sheet has been separated from the photoreceptor drum 10, the residual toner on the surface of the photoreceptor drum 10 is removed and the surface of the photoreceptor drum 10 is cleaned in a cleaning device 19. In this way, the toner image formation is continued for a document image, or alternatively the toner image formation is once stopped and the apparatus waits for a next toner image formation for a new document image.

The photoreceptor drum 10, the charger 11, developing unit 13 and cleaning unit 19 are integrally accommodated in the cartridge 30. Under the above integrating condition, the cartridge 30 can be attached to and detached from the apparatus body without giving a load or shock to the image exposure means while the support member 20 having the optical exposure system 12 is left in the apparatus body. The above structure in which the support member 20 is left in the apparatus body in the operation for attachment and detachment has an advantage that the heater 201, heat pipe 202, lead 203 for acting LED, and optical exposure system 12 can be maintained fixed to the support member 20 even if the photoreceptor drum is rotated, attached or detached. Further, it is possible to use the above structure for determining the axis of the photoreceptor drum 10 as mentioned below.

Figure 3:
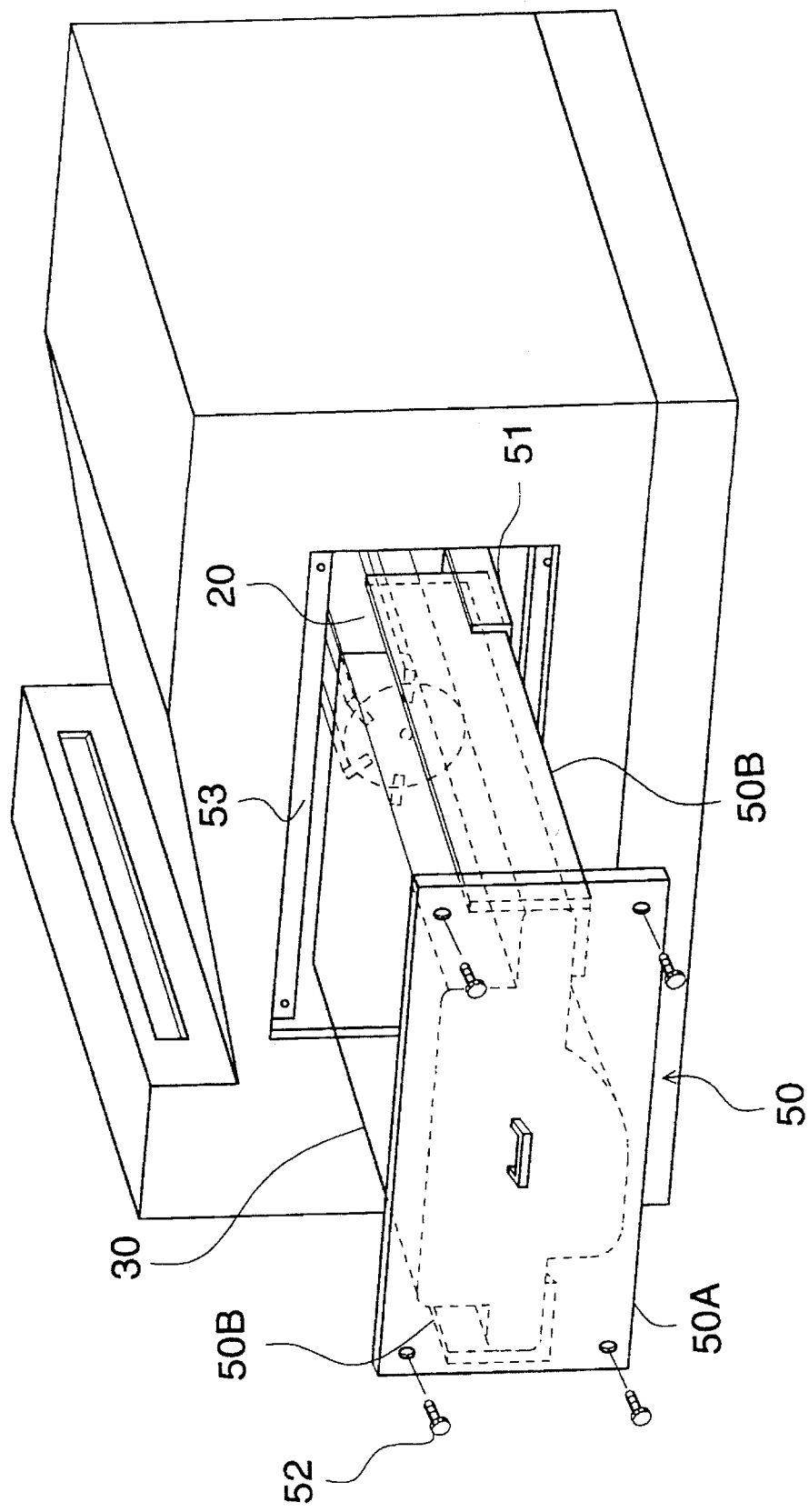
FIG. 3 is a perspective view showing a way to mount or dismount a cartridge in the present invention.

The cartridge 30 as shown in FIG. 3 is accommodated in a movable frame 50 detachably attached to the side of the apparatus body.

The movable frame 50 is composed of a side plate 50A and a support mount 50B integrated with the side plate 50A. Under the condition that the cartridge 30 is provided on the movable frame 50 and further the position is regulated, the movable frame 50 is horizontally slid along the guide rails 51.

When the movable frame 50 is inserted into the apparatus, a guide pin 30P for supporting the photoreceptor drum 10 is engaged with the support member 20 for attaching the optical exposure system 12, and then the internal circumferential surface of the flange 10B is fit with the guide roller 40R on the base plate 40. Thereafter, the side plate 50A is closely contacted with the collision portion 53 of the apparatus body, and the screw 52 is used as a fixing means for fixing the movable frame 50. With this construction, the axis of the photoreceptor drum 10 and the center of the photoreceptor drum 10 in its axial direction can be positioned precisely in relation to the image forming section.

When the movable frame 50 is pulled out from the apparatus body, the slide movement of the movable frame 50 is stopped at a position where the photoreceptor drum 10 is released from the support member 20 on which each optical exposure system 12 is mounted, so that the movable frame 50 is supported by the guide rails 51.

When the movable frame 50 is pulled out, the flange 10B of the photoreceptor drum 10 is disengaged from the guide roller 40R mounted on the base plate 40 and supported by several folding portions 30A formed integrally with the cartridge 30, so that the axial position of the photoreceptor drum 10 can be maintained in the same position as that of insertion of the movable frame 50. Accordingly, when the movable frame 50 is inserted again, it is easy for the flange 10B to engage with the outer periphery of the guide rollers 40R, so that the axial position of the photoreceptor drum 10 can be maintained at the correct position.

The photoreceptor drum 10 of the above examples has a relatively small diameter. However, since the optical exposure system 12 is accommodated in the photoreceptor drum 10, it is possible to arrange a plurality of chargers 11 and developing units 13 on the outer circumferential surface of the photoreceptor drum 10 with an application of a small drum, the outer diameter of which is 60 to 160 mm, it is possible to reduce the dimensions of the apparatus.

Figure 4:
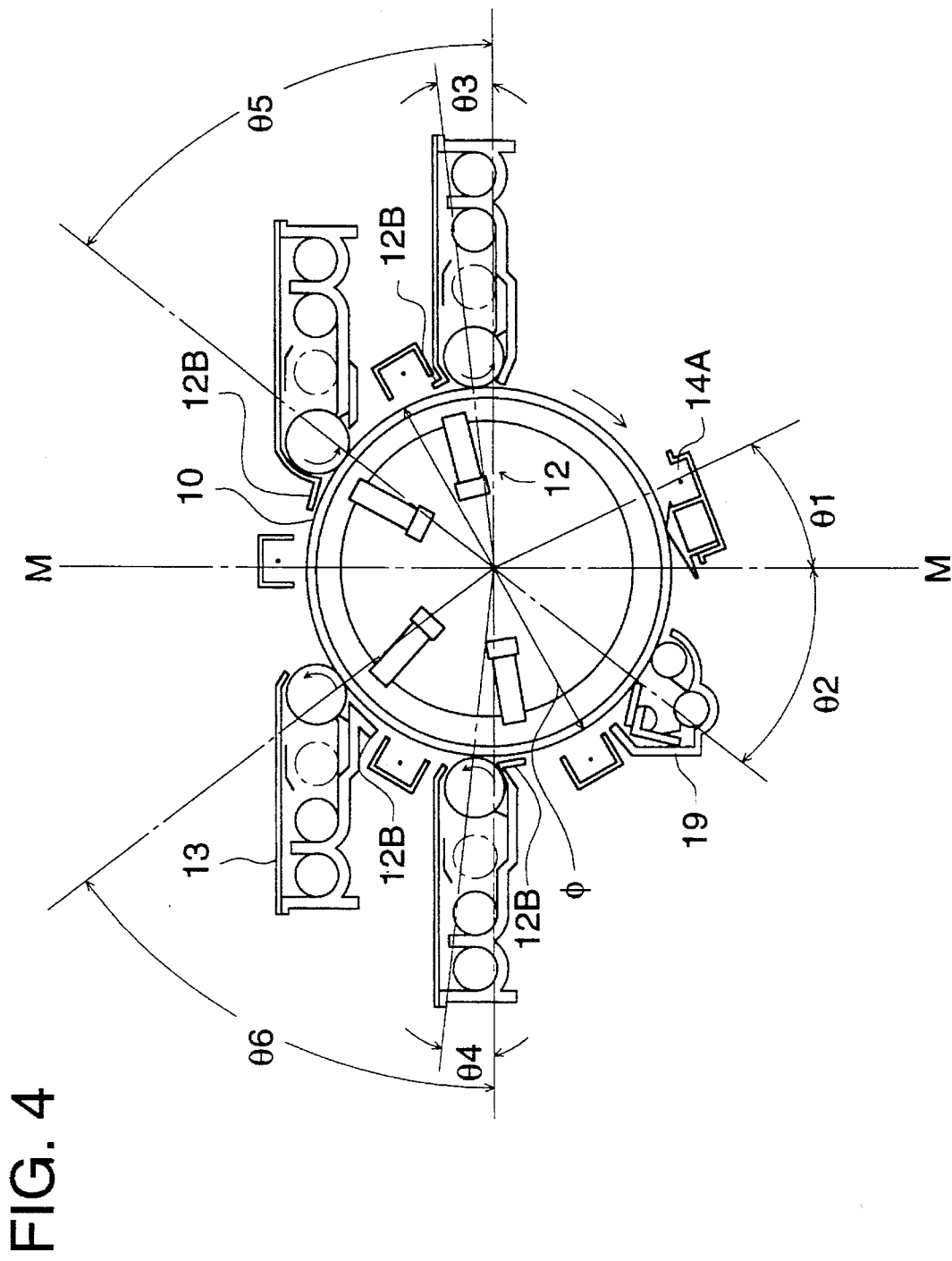
FIG. 4 is an arrangement view showing a layout in a cartridge.

As illustrated in FIG. 4, two optical exposure systems 12 are respectively arranged on the right or left side symmetrically with respect to the vertical line M—M passing through the center of the photoreceptor drum 10. Further, the transfer unit 14A is arranged on one side, and the cleaning device 19 is arranged on the other side. Due to the above arrangement, the cartridge 30 is composed in a well-balanced condition in relation to its left and right sides. Therefore, it is easy to handle it.

As illustrated in FIG. 4, it is possible to effectively use spaces around the photoreceptor and to provide a well-balanced layout with respect to a vertical balance and an outer shape balance when each unit is arranged in the following manner:

The optical exposure system 12 and the developing unit 13 are arranged respectively at a left or right sides opposed to each other symmetrically with respect to the vertical line M—M. The transfer unit 14A is arranged under the horizontal line N—N on the upstream side of the vertical line M—M with respect to the rotation direction of the photoreceptor drum 10, and an angle θ1 formed between the center line of the transfer unit 14A and the vertical line M—M is made 5° to 40°. On the other hand, the cleaning unit 19 is also arranged under the horizontal line N—N on the downstream side of the vertical line M—M with respect to the rotation direction of the photoreceptor drum 10, and an angle θ2 formed between the center line of the cleaning unit 19 and the vertical line M—M is made 10° to 50°. A pair of developing units 13 are arranged above the horizontal line N—N, and an angle of θ3 or θ4 formed between the center line of the sleeve of each developing unit 13 and the horizontal line N—N form is made within ±20°. Further, a pair of developing units 13 are further arranged in the upper positions, and an angle of θ5 or θ6 formed between the center line of the sleeve of each developing unit 13 and the horizontal line N—N is made 45° to 75°.

Figure 1:
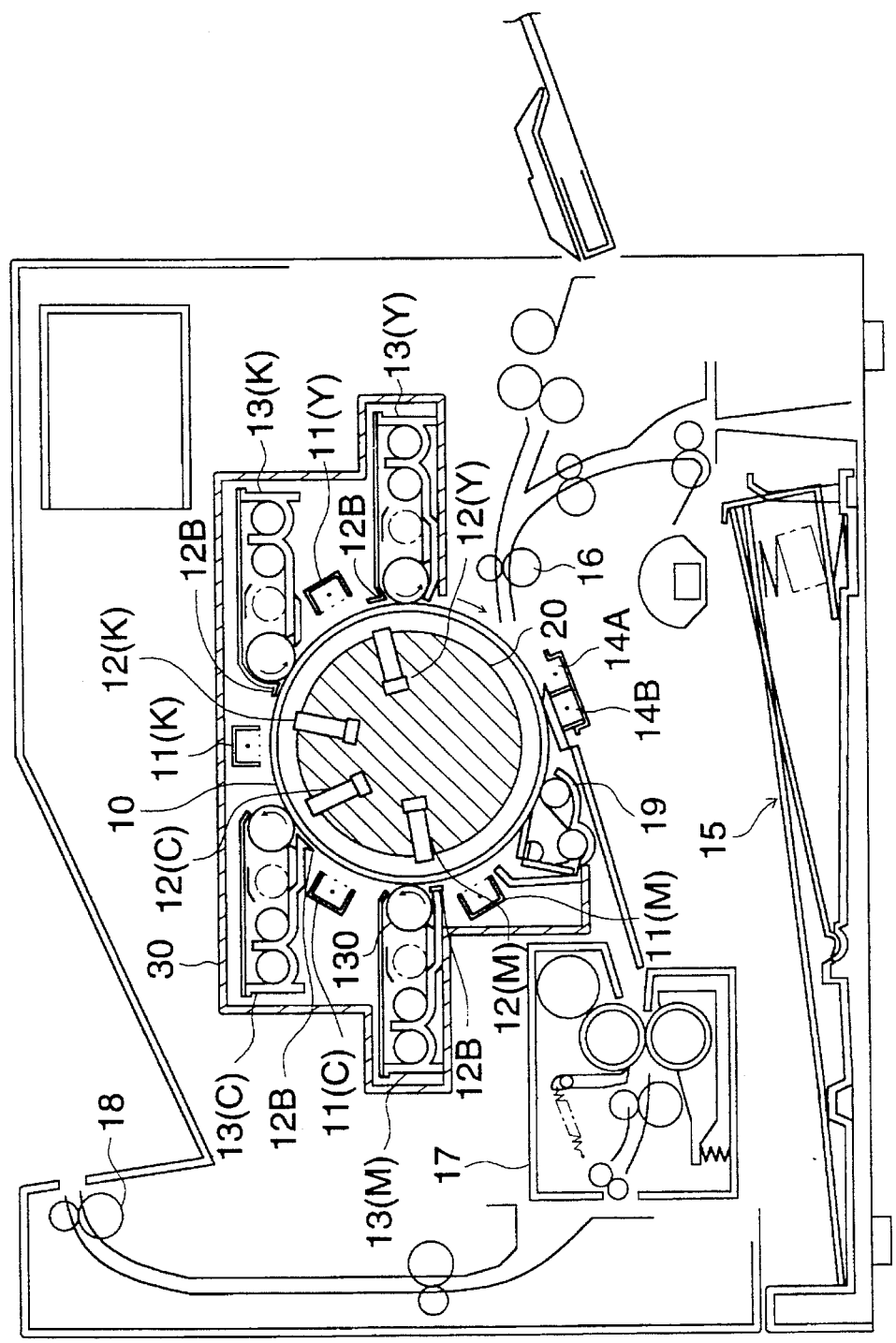
FIG. 1 is a sectional view showing a construction of a color image forming apparatus of the present invention.

In FIG. 1, the reference numeral 12B is a light absorbing member provided on the outside surface of the photoreceptor drum 10 at a position opposite to the optical exposure system 12, the light absorbing member 12 B is made of a light absorbing material capable of absorbing an exposure light such as a black paper. As one example, the light absorbing member 12 B is provided on a supporting member attached to the casing of the developing unit and absorbs an exposure light passing through the photoreceptor drum 10 composed of a base member 10a, a transparent conductive layer 10b and a photosensitive layer 10c so that the absorbed light becomes a unnecessary light and is not scattered toward the exposing section.

In this example, as abovementioned, after the magenta, cyan and black toner images have been formed, the yellow image is formed lastly, whereby exposure lights are rarely reflected by a toner image. Further, when no toner image is formed, since exposure lights are absorbed by a light absorbing member 12B, the scattering of unnecessary lights can be made extremely few. Since a black toner have the lowest spectral reflectance, when it is used prior to magenta and cyan toners (black-(magenta,cyan)-yellow), the most preferable result may be obtained.

Example 2

Figure 2:
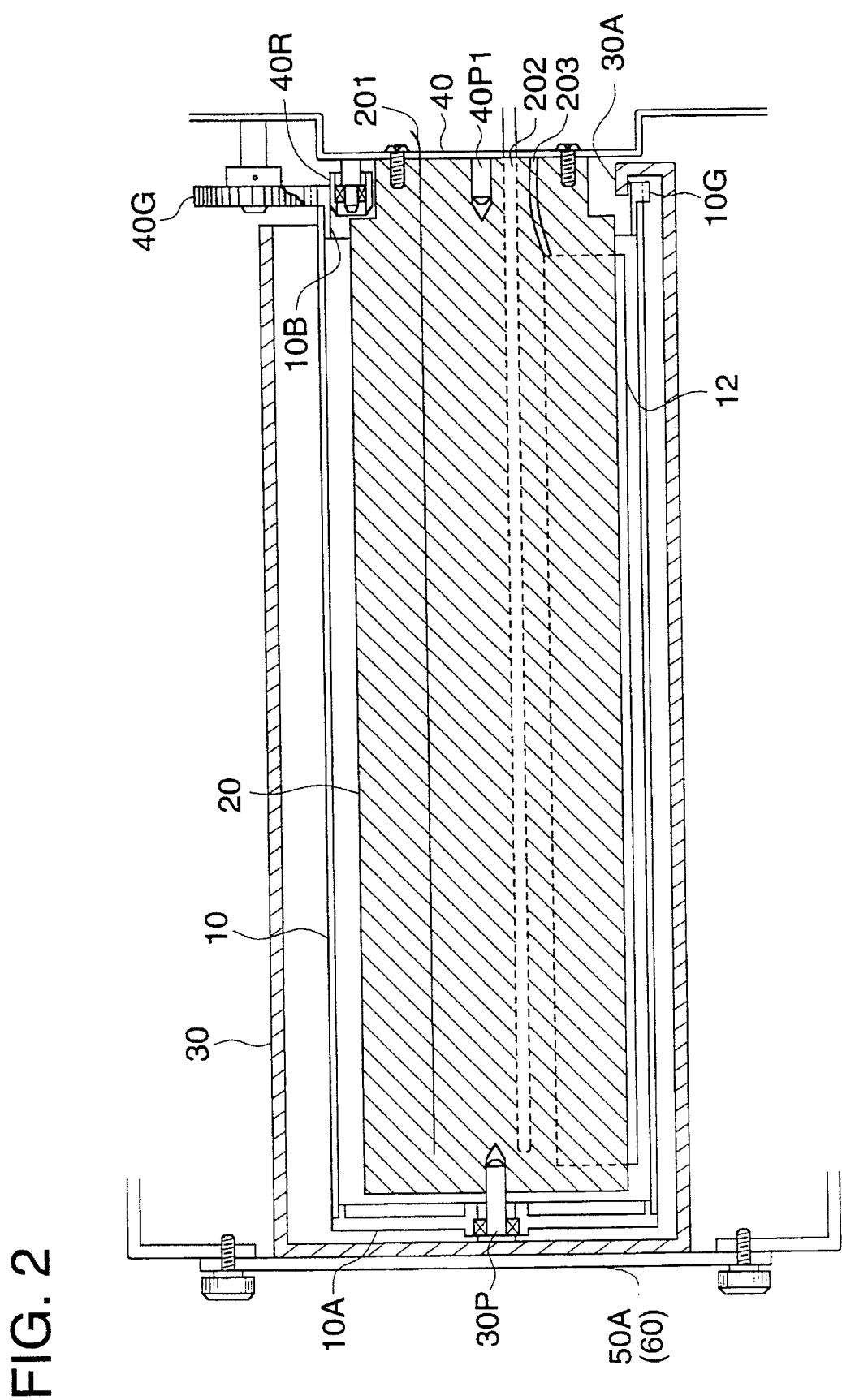
FIG. 2 is a view showing a primary portion of the apparatus described above.

Although a construction of Example 2 is similar to that of Example 1 shown in FIGS. 1 through 3, exposure lights having the wavelength of 420 to 550 nm are used in optical exposure system 12. Developing devices are arranged in an order with which a toner image formation process is conducted in such an order that yellow (Y), magenta (M), and black (BK) toner images are firstly formed and then cyan (C) toner image is formed lastly. Further, at the position of the light absorbing member 12b in FIG. 1 in Example 1, an electrode can be provided with an insulating member on the supporting member in place of the light absorbing member 12b. Then, the electrode is applied with a voltage which has the same polarity as that of the charged toner and is larger in absolute value such as −800 V than the charged potential (−750 V) of the photoreceptor drum 10 or a voltage (−600 V) applied on the developing sleeve 130. The surface of the electrode facing the photoreceptor 10 is made in a rough surface and is colored with a black. With this construction, similar to the Example 1, the electrode can absorb the exposure light so that the scattering of the unnecessary light can be made very little. In addition, the electrode can repulse the toner on the exposure section so that the soiling with toner can be avoided. Since the black toner image has the lowest spectral reflectance, the most preferable result may be obtained when the black toner image is formed prior to the yellow and magenta toner image (black→(yellow,magenta)→cyan).

Example 3

Although a construction of Example 3 is the same as that of Example 1 and Example 2, since exposure lights having the wavelength smaller than 420 nm are used in optical exposure system 12, there is no need to adhere to a specific image formation order. With this arrangement, the scattering of unnecessary lights can be made extremely few and a degraded toner image can be avoided, likewise with Example 1 and Example 2. Since the black toner image has the lowest spectral reflectance, the most preferable result may be obtained when the black toner image is formed prior to the yellow and magenta toner image (black→(yellow, magenta)→cyan).

With the constructions shown in Examples 1, 2 and 3, in a color image forming apparatus of a type in which an exposure means is incorporated in an image forming member, as an optical exposure system the following optical exposure system is used. The optical exposure system emits exposure lights which have a sensitivity to a photosensitive layer of the image forming member and are composed of a wavelength having a reflection ratio lower than 30% for a toner image firstly formed on the image forming member. In addition, another toner image on which the reflection ratio of the above exposure lights is larger than 30 is arranged so as to be formed finally. In the result, it can be possible to provide a color image forming apparatus which can prevent unnecessary lights from scattering and a toner image from being degraded so that an appreciably clear image can be obtained.

The second object of the present invention can be attained by the constructions as shown in Examples 4 through 9 which will be explained hereinafter.

Example 4

Figure 7:
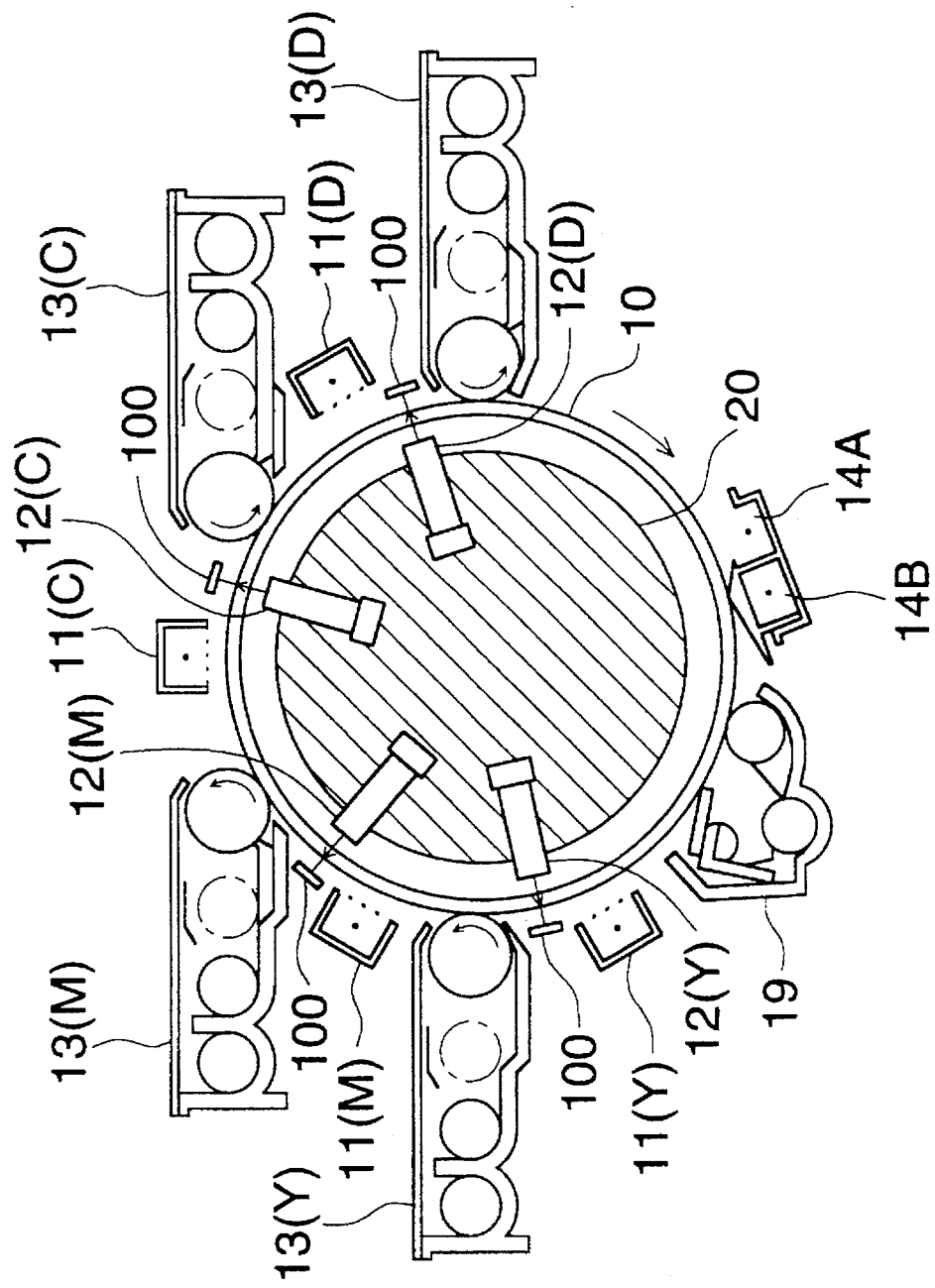
FIG. 7 is an arrangement view of an optical exposure system of the fourth example.

The construction of Example 4 is explained, referring FIG. 7.

Each optical exposure system 12 is provided with a light absorbing member 100 on the outside of the photoreceptor drum where is opposite to at an exposure position of the corresponding optical exposure system 12. The light absorbing member 100 is a plate-shaped member having a given width and a length corresponding to the length of the photoreceptor drum in its axial direction.

The light absorbing member 100 is arranged at a position on which the light absorbing member 100 receives all of transmission lights emitted to the outside of the photoreceptor drum 10 when an image exposure is conducted onto the photoreceptor 10 by the optical exposure system 12.

The light absorbing member 100 is adapted to absorb the image exposure lights with at least its one side facing the photoreceptor drum 10. For example, its surface condition is made black and non-glossy so that the light absorbing member 100 absorbs efficiently the transmission lights without reflecting them. In the result, the photosensitive layer can be prevented from being exposed again with the transmission light reflected on the inside of the machine.

Basically, any color capable of absorbing an image exposure light can be used as a color of the light absorbing member 100. However, in order to make an influence by a light leaking from a transfer section, a cleaning section, an pre-transfer exposure, and the outside of the machine smaller, black is preferable.

In the case that the light absorbing member 100 is made of an electrically conductive member which can be also used as an electrode, when an image exposure is conducted on a toner image, an electric field which presses the toner onto the image forming member can be formed by the light absorbing member 100 applied with an electric voltage of the same polarity as that of the toner, whereby it can be possible to avoid the toner scattering.

Example 5

Figure 8:
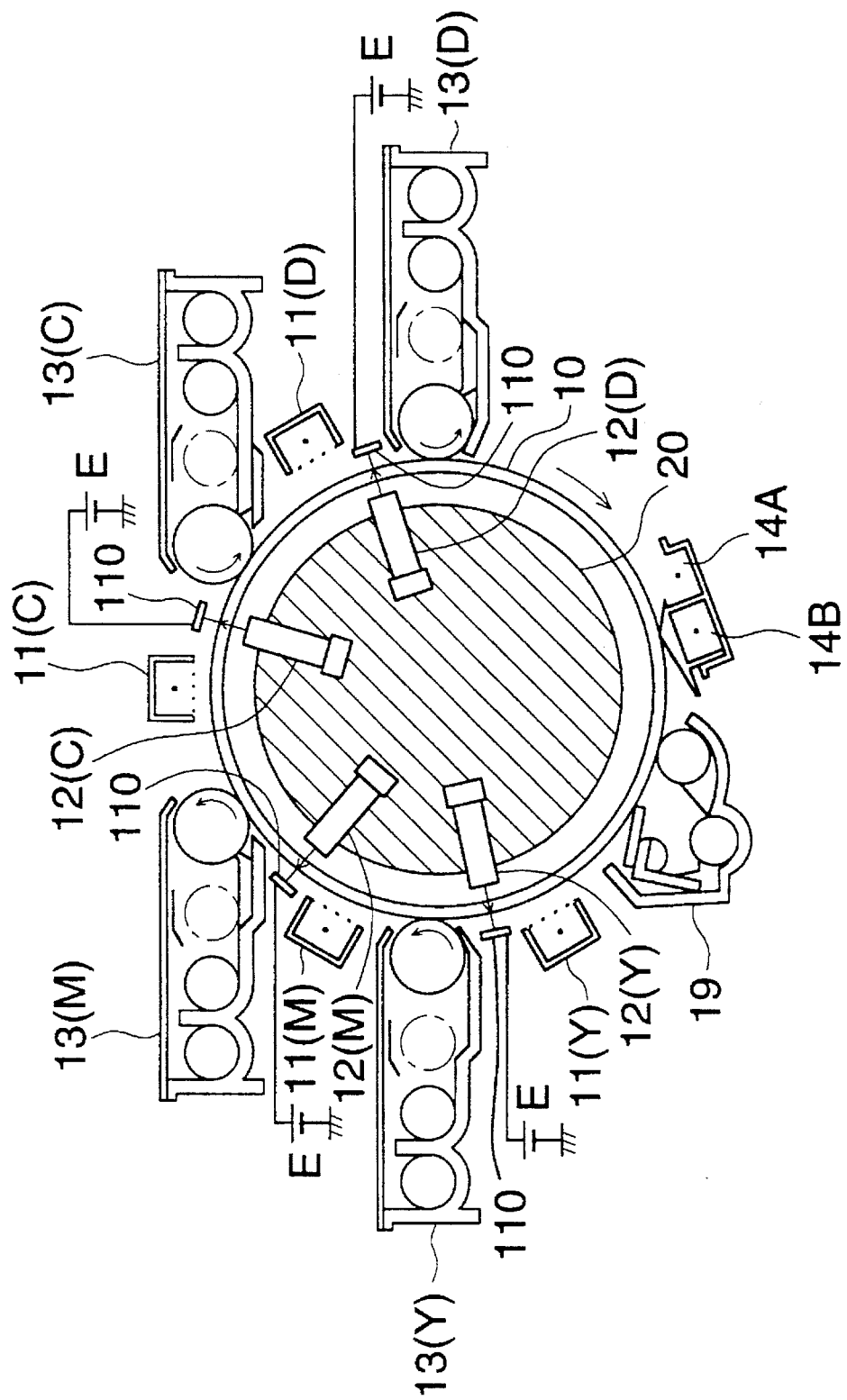
FIG. 8 is an arrangement view of an optical exposure system of the fifth example.

The construction of Example 5 is now explained, referring FIG. 8.

Each optical exposure system 12 is provided with an electrode member 110 on the outside of the photoreceptor drum where is opposite to at an exposure position of the corresponding optical exposure system 12. The electrode member 110 is a plate-shaped member having a given width and a length corresponding to the length of the photoreceptor drum in its axial direction.

The electrode member 110 is arranged at a position on which the light absorbing member 100 receives all of transmission lights emitted to the outside of the photoreceptor drum 10 when an image exposure is conducted onto the photoreceptor 10 by the optical exposure system 12.

The electrode member 110 is applied with the electric voltage E of the same polarity as that of the toner simultaneously with the irradiation of an image exposure by the optical exposure system 12, whereby toner of the toner image which have been formed on the image forming member can be pressed and prevented from floating or scattering by the irradiation of the image exposure conducted on the toner.

In the case that the electric voltage E is set higher than the charge potential on the photoreceptor drum 10 by the charging device 11 or a DC voltage component of a bias applied onto a developing sleeve of a developing device 13, the effect of the electrode member 110 can be obtained efficiently.

If the electrode member 110 is adapted to have the surface condition of black and glossy on at least its one side facing the photoreceptor drum 10, the electrode member 110 can also act as a light absorbing member for absorbing efficiently the transmission lights passing through the photosensitive layer in the time of an image exposure and for preventing the photosensitive layer from being exposed again with the reflected transmission lights.

Basically, any color capable of absorbing an image exposure light can be used as a color of the light absorbing member 100. However, in order to make an influence by a light leaking from a transfer section, a cleaning section, an pre-transfer exposure, and the outside of the machine smaller, black is preferable.

Example 6

Figure 9:
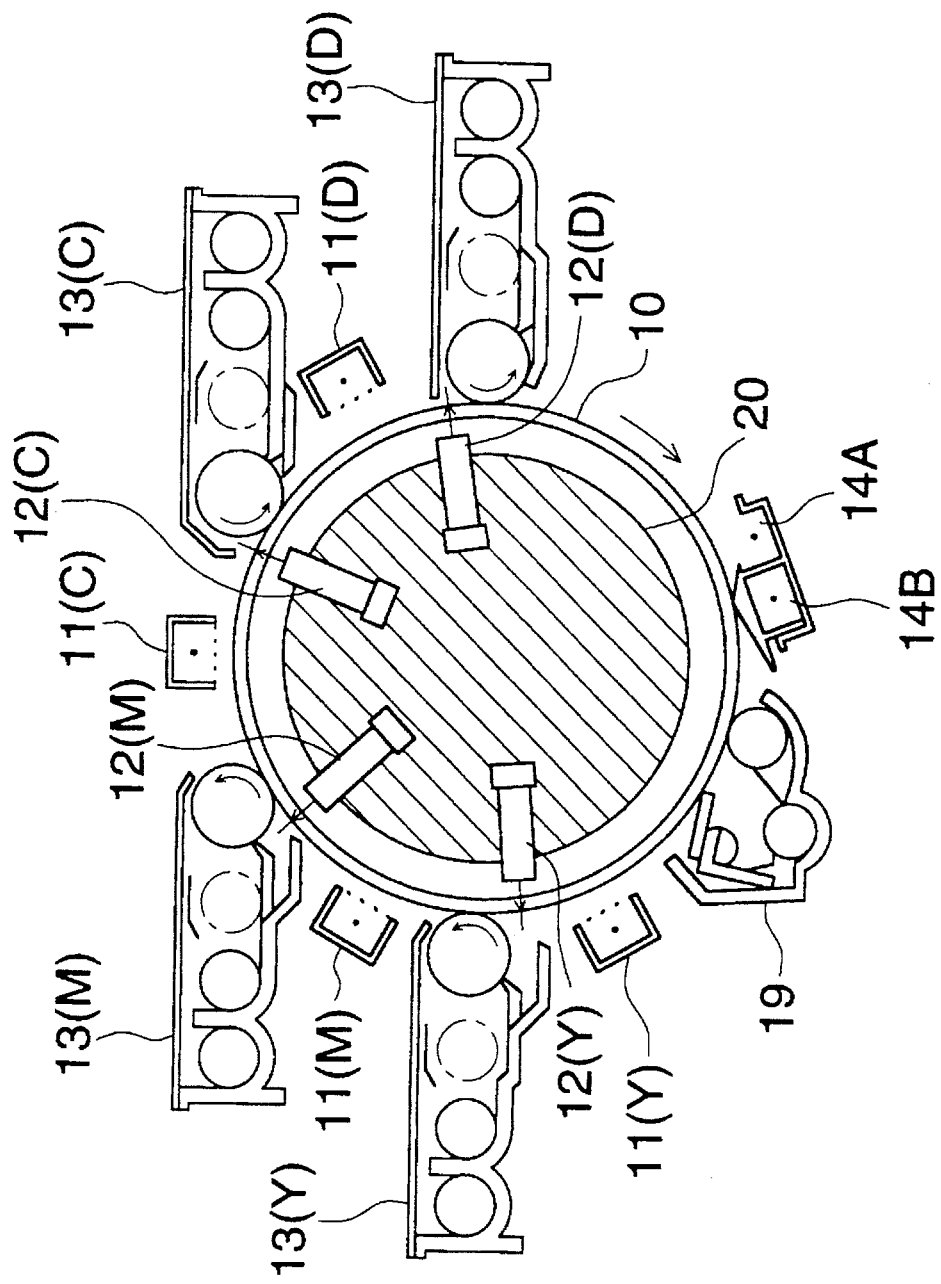
FIG. 9 is an arrangement view of an optical exposure system of the sixth example.
Figure 10:
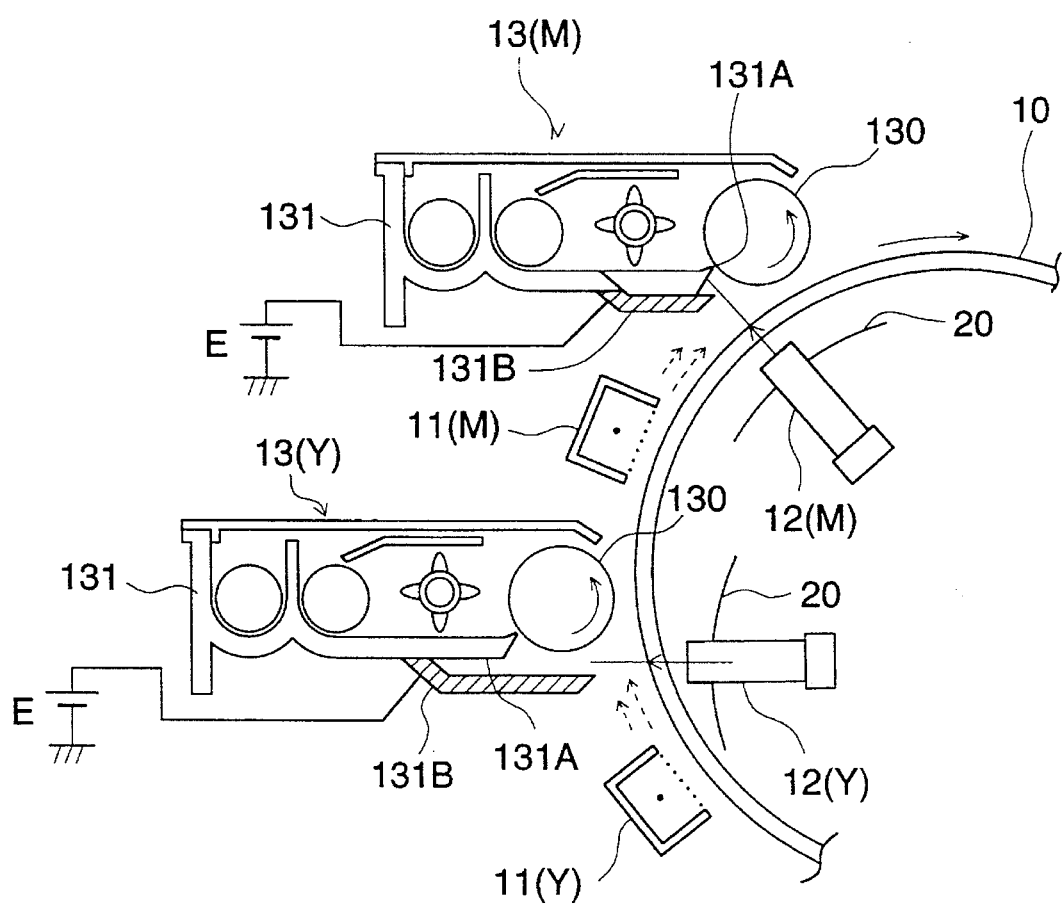
FIG. 10 is a view showing a primary portion of an optical exposure system of the sixth example.

The construction of Example 6 is explained, referring FIGS. 9 and 10.

As shown with an arrow mark, the exposure position of each optical exposure system 12 is set upstream of the developing sleeve 130 in the housing of the developing device 13 on the circumferential surface of the photoreceptor drum 10.

Since an air flow is created in the opening section of the housing 131 upstream of the sleeve in a direction indicated with a dashed line in FIG. 10 by the rotational motion of the photoreceptor drum 10.

Further, in the event that an internal wall surface 131A of the housing 131 opposite to the exposure position is formed by a light absorbing member of black and non-glossy, the internal wall surface 131A absorbs transmission lights of an image exposure light passing the photosensitive layer, thereby having a function of preventing a latent image from being agitated by a reflected light in the housing.

Still further, in the event that a portion of the housing 131 where is neighboring or upstream of the image exposure section is formed by an electrode member 131B and is applied with an electric voltage E of the same polarity as that of the toner, toner of the toner image which have been formed on the image forming member can be pressed and prevented from floating or scattering by the irradiation of the image exposure conducted on the toner.

In this case, since the reversal development is conducted in the developing process, if the electric voltage E has the same polarity as the toner and has a voltage level higher than a charging voltage on the photoreceptor 10 by the charging device 11 and a DC component of a bias voltage for the developing sleeve of the developing device 13, the effect can be obtained efficiently.

Example 7

Figure 11:
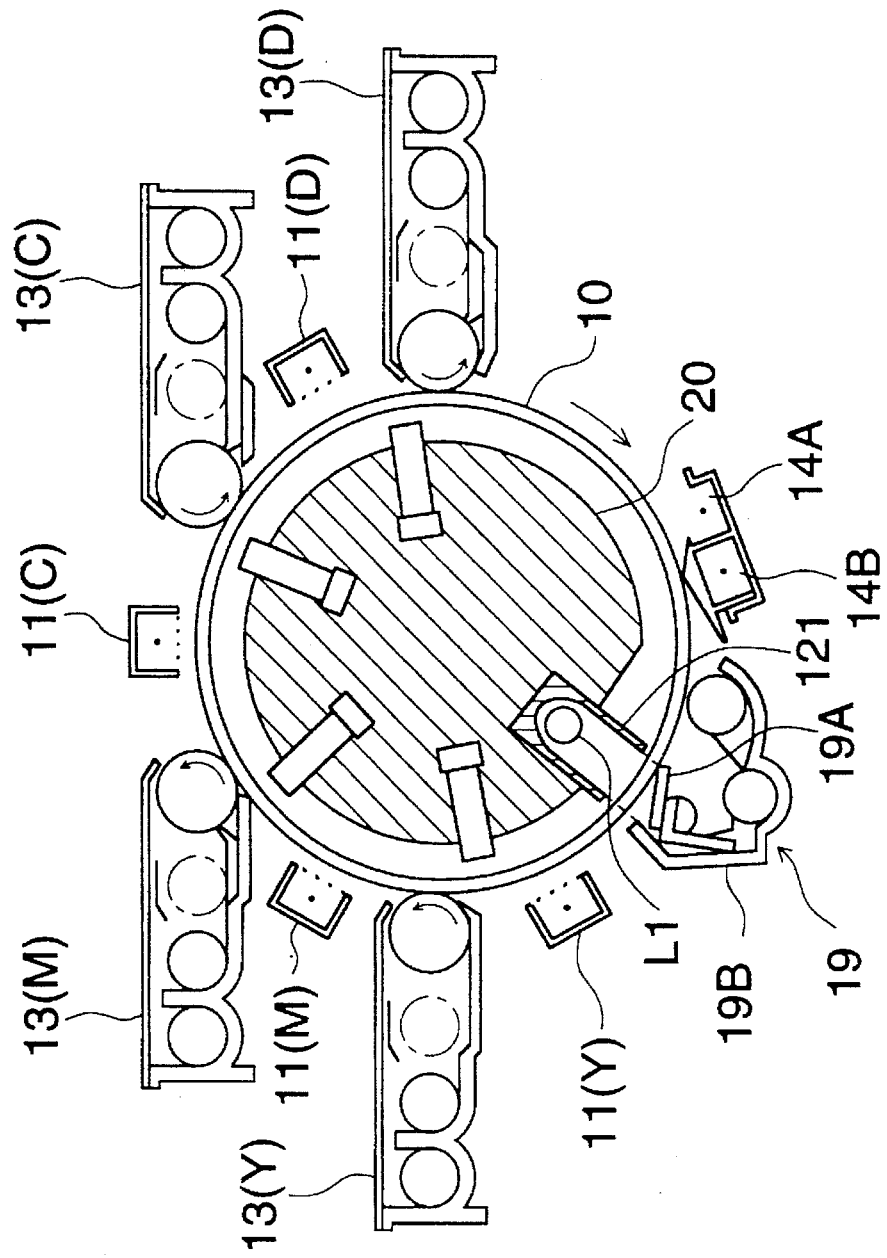
FIG. 11 is an arrangement view of a pre-charging exposure means of the seventh example.

The construction of Example 7 is explained, referring FIG. 11.

A supporting member 20 further supports an exposure lamp or a LED array used as a light source of a pre-charging exposure means L1. Since the base member of the photosensitive drum 10 is of a transparent member, the pre-charging exposure for the photoreceptor is conducted from the inside of the drum.

A light source having a length corresponding to a length of the photoreceptor drum 10 in the axial direction is used as the pre-charging exposure means L1. The exposing region of the pre-charging exposure means L1 is limited by a reflection member 121 whose inside is shaped in a concave mirror to a portion on the circumferential surface of the drum where locates from a pressing point of a blade 19A worked as a cleaning means of the cleaning device 19 to an edge of a housing 19B downstream of the pressing point.

Accordingly, since the pre-charging exposure means L1 absolutely has not a risk that scattering toners caused by the cleaning may adhere and there is no risk that transmission lights passing through the photosensitive layer may leak outside of the cleaning device 19B, the photoreceptor can be evenly charged by the charging operation in a new image formation process conducted successively.

Incidentally, in the event that an internal surface of the cleaning housing 19B is made in a surface condition of black and non-glossy so as to work as a light absorbing member, a slight amount of irradiation lights reflected in the housing can be prevented from leaking to the outside.

Example 8

Figure 12:
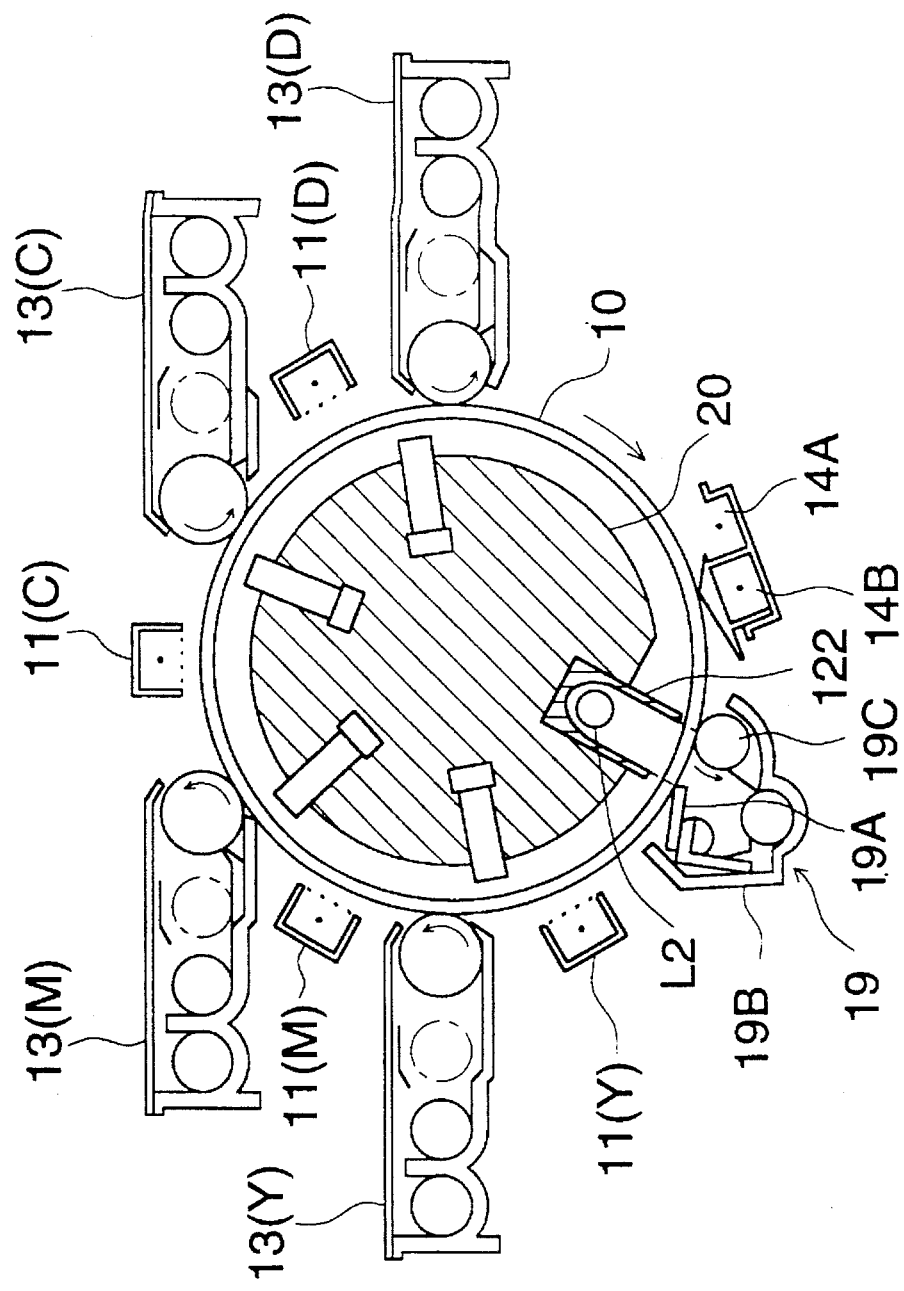
FIG. 12 is an arrangement view of a pre-cleaning exposure means of the eighth example.

The construction of Example 8 is now explained, referring FIG. 12.

A supporting member 20 further supports an exposure lamp or a LED array used as a light source of a pre-cleaning exposure means L2. Since the base member of the photosensitive drum 10 is of a transparent member, the pre-cleaning exposure for the photoreceptor is conducted from the inside of the drum.

A light source having a length corresponding to a length of the photoreceptor drum 10 in the axial direction is used as the pre-cleaning exposure means L2. The exposing region of the pre-cleaning exposure means L2 is limited by a reflection member 122 whose inside is shaped in a concave mirror to a portion on the circumferential surface of the drum where locates from a pressing point of a blade 19A worked as a cleaning means of the cleaning device 19 to a pressing point of a plate-shaped or a roller-like toner collecting member 19C provided upstream of the blade 19A.

Residual toners remaining on the photosensitive drum 10 after a toner image on the drum 10 has been transferred is scraped off and drop from the drum surface by the blade 19A, then the residual toners are conveyed along the toner collecting passage by the rotation of the toner collecting member 19c, thereby being collected.

Accordingly, since the pre-cleaning exposure means L2 absolutely has not a risk that scattering toners caused by the cleaning may adhere on it and the irradiation lights of the pre-cleaning exposure means L2 are concentrated at a portion of the drum surface upstream of the blade 19A so that residual charge on the portion can be efficiently eliminated. In the result, the removal of the residual toner can be efficiently conducted by the blade 19A.

In the case that the exposing region of the pre-cleaning exposure means L2 is further extended to an edge of the cleaning housing 19B downstream of the blade 19A, the pre-cleaning exposure means L2 can be used as a light source for both the pre-cleaning exposure and the pre-charging exposure.

Example 9

Figure 13:
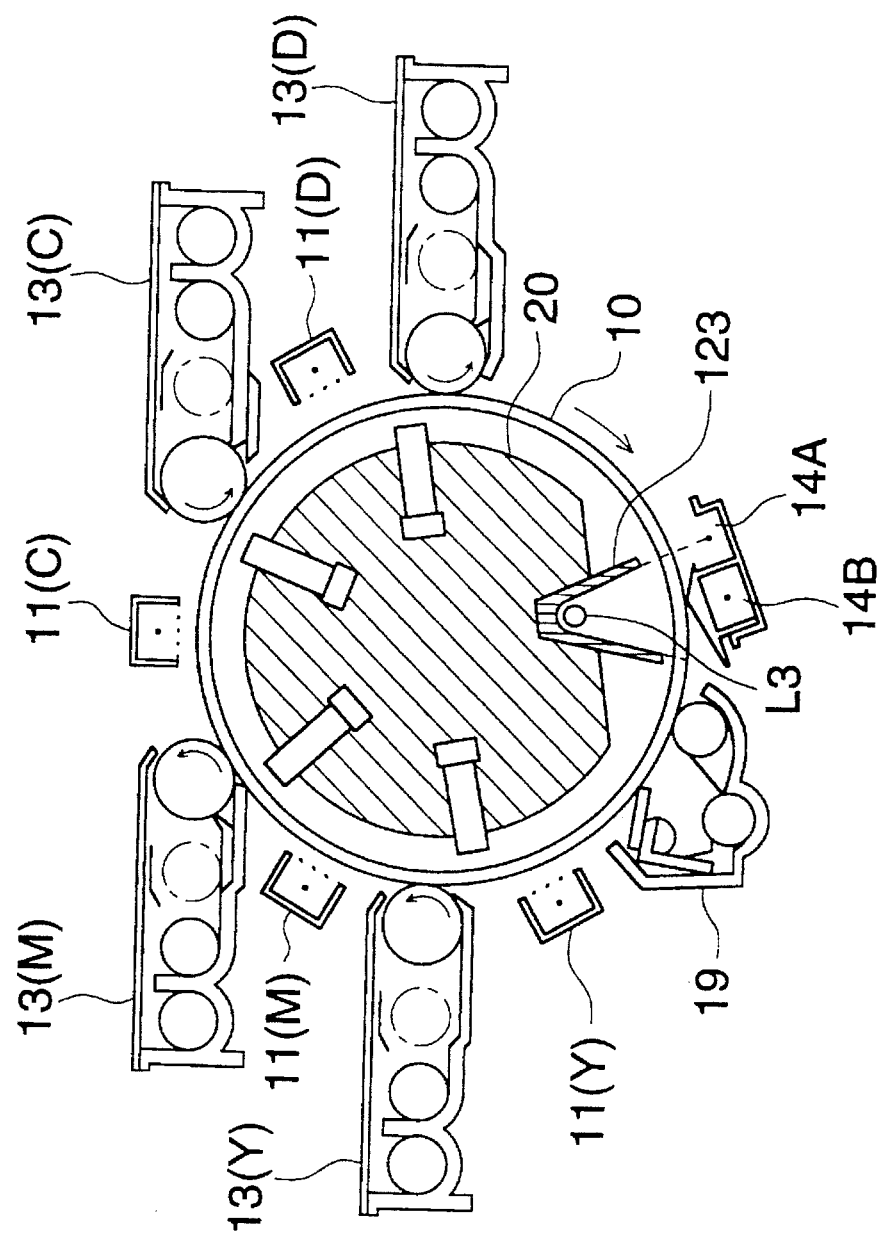
FIG. 13 is an arrangement view of a transfer simultaneous exposure means of the ninth example (the first one).
Figure 14:
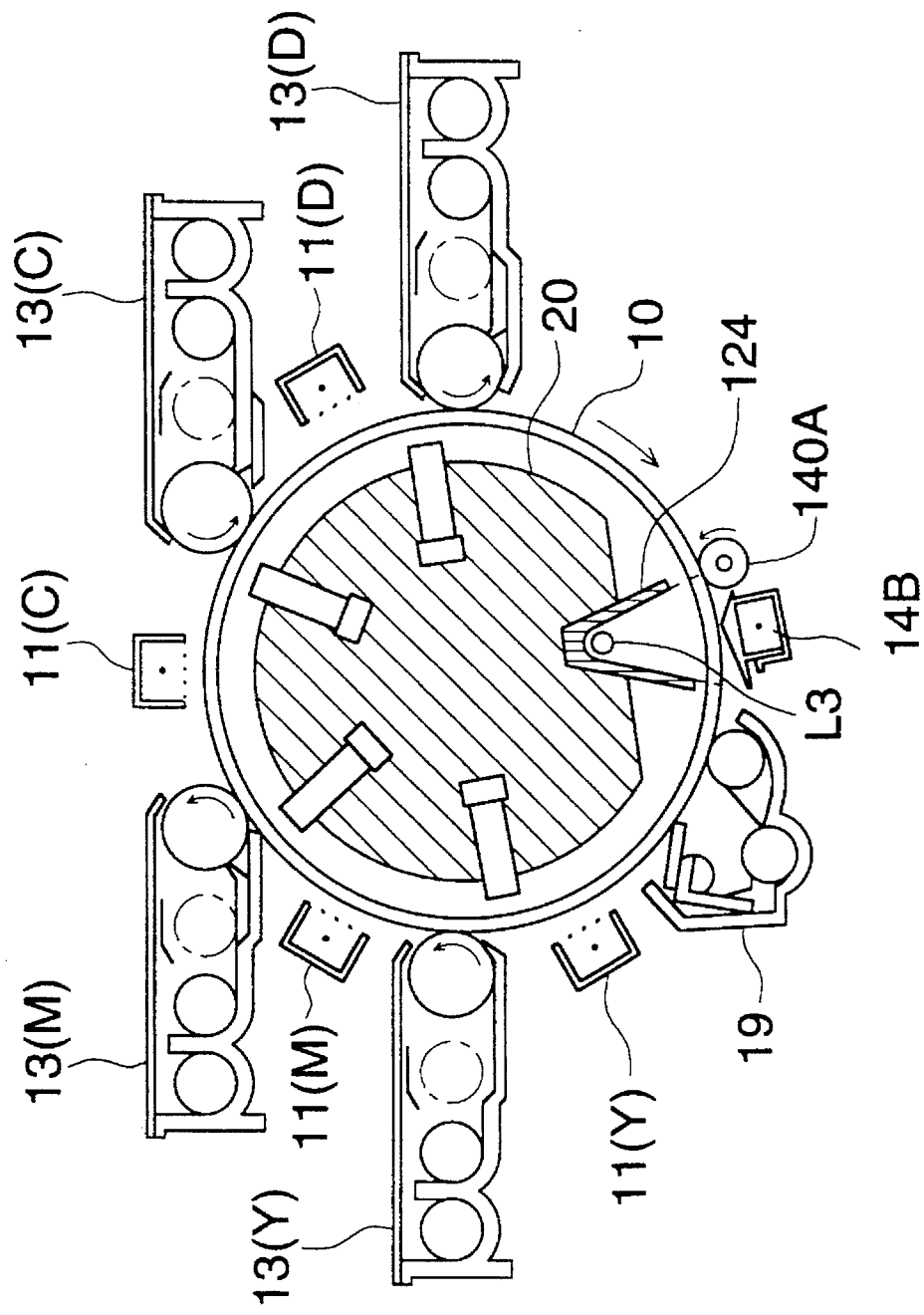
FIG. 14 is an arrangement view of a transfer simultaneous exposure means of the ninth example (the second one).

The construction of Example 9 is now explained, referring FIGS. 13 and 14.

A supporting member 20 further supports an exposure lamp or a LED array used as a light source of a transfer simultaneous exposure means L3. Since the base member of the photosensitive drum 10 is of a transparent member, the transfer simultaneous exposure for the photoreceptor is conducted from the inside of the drum.

A light source having a length corresponding to a length of the photoreceptor drum 10 in the axial direction is used as the transfer simultaneous exposure means L3. The exposing region of the transfer simultaneous exposure means L3 is limited by a reflection member 123 whose inside is shaped in a concave mirror to a portion on the circumferential surface of the drum where locates downstream of the closest position on which the photoreceptor come the most closely to an electrode of the transfer device 14A for corona discharging and the transfer simultaneous exposure is conducted uniformly on the exposing region.

If the exposure is conducted for the portion upstream of the closest position on the circumferential surface of the drum, adhering force between the toner and the image forming member is lowered, resulting in that toners tend to fly away easily and a toner image will be soiled with the flying toners.

The above exposing region is limited within an area where the downstream side of the exposing region is extended over a separation region by an elimination electrode 14B to a position of the cleaning device 19.

Since the transfer simultaneous exposure means L3 acts by its irradiation so as to eliminate the charge on the photosensitive drum 10 carrying a toner image when the toner image is transferred to a transfer sheet, the transferring of the toner image by the transfer device 14A can be conducted evenly efficiently. Further, for a portion of the photoreceptor on which the transferring has been finished, since the transfer simultaneous exposure means L3 eliminates efficiently electric charges on the portion in cooperation with a charge eliminating device 14B, the separation of the transfer sheet from the drum surface and the removal and cleaning of residual toners by the cleaning device 19 can be promoted.

In the case that the irradiation by the transfer simultaneous exposure means L3 is started after a transfer sheet has come in close contact with the image forming member and has been provided with electric charges by an electrode of the transfer device 14A, the agitation for an toner image on the photoreceptor can be avoided and the toner image can be transferred stably.

On the other hand, as shown in FIG. 14, in an apparatus in which a transfer roller 140A is used for the transferring of a toner image, the exposing region of the exposure lamp L3 is limited by a reflecting mirror 124 so that a portion on the circumferential surface of the drum downstream of a press contact point of the transfer roller 140A is exposed uniformly. In this case, when a transfer sheet passes a nip region formed between the transfer roller 140A and the drum surface, the transfer sheet comes in close contact with the image forming member and is provided with electric charges, the agitation for an toner image on the photoreceptor can be avoided and the toner image can be transferred stably.

According to the present invention, each image exposure means for forming a latent image on the photoreceptor and each uniform exposure means for eliminating electric charges can be made in one unit so that each image exposure means and each uniform exposure means can be incorporated in the photoreceptor and each exposure can be conducted by a common light source. As a result, the reliability of the exposing function can be enhanced and, simultaneously, the volume can be sized down in a small type. Further, the structure can be made simple. Thereby, it is possible to provide a color image forming apparatus with which the cost reduction can be expected.

What is claimed is:

1. An apparatus for forming a color toner image in which an image forming process including a charging process, an image exposure process and a development process are repeated so that a yellow, magenta, and cyan toner images are superimposed on a rotatable image forming member, comprising:

the rotatable image forming member made of a transparent material and having an internal hollow space;

a charging device for charging an outer surface of the image forming member to a given electric potential;

image exposure means provided in the internal hollow space so that an image exposure is conducted from an exposing position in the internal hollow space, developing means provided outside of the image forming member so that a toner image is formed on the outer surface of the image forming member; and a light absorbing member provided outside of the image forming member opposite to the exposing position so that the light absorbing member absorbs the exposure light passing through the image forming member.

2. The apparatus of claim 1, wherein the light absorbing member is an electrode applied with an electric voltage.

3. The apparatus of claim 2, wherein the electric voltage is higher than the given electric potential on the outer surface of the image forming member.

4. The apparatus of claim 2, wherein the developing means includes a developing sleeve on which a developing potential is applied, and the electric voltage is higher than the developing potential on the sleeve.

5. The apparatus of claim 4, wherein the light absorbing member is provided at the position located upstream of the developing sleeve.

6. The apparatus of claim 2, wherein the electric voltage has the same polarity as that of toner.

7. The apparatus of claim 1, wherein the developing means comprises a developing unit housing and a developing sleeve provided in the developing unit housing, and the exposing position is provided at a position located in the developing unit housing and upstream of the developing sleeve in the rotating direction of the image forming member.

* * * * *